No. 894,270. PATENTED JULY 28, 1908.
G. A. HOLMES.
SNAP FASTENER.
APPLICATION FILED FEB. 11, 1908.
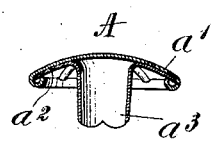
Fig. 1.
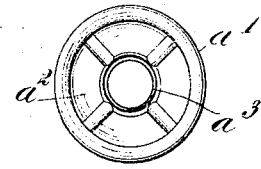
Fig. 2.
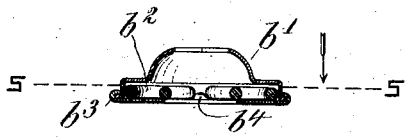
Fig. 3.
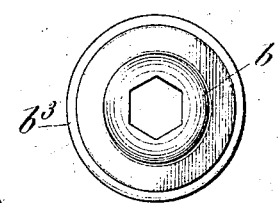
Fig. 4.
Fig. 5.
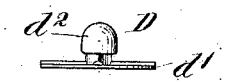
Fig. 6.
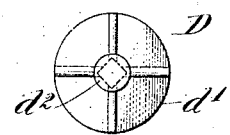
Fig. 7.
Fig. 8.
Fig. 9.
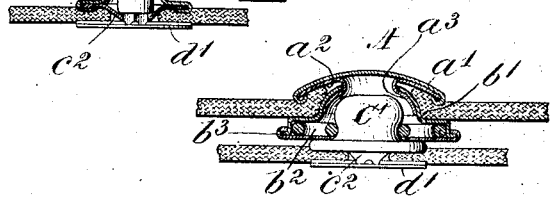
Fig. 10.
WITNESSES:
Charles J. Woodberry
Josephine H. Ryan
INVENTOR-
George A. Holmes
by Roberts Roberts & Cushman
Attorneys

UNITED STATES PATENT OFFICE.

GEORGE A. HOLMES, OF NEWTON, MASSACHUSETTS, ASSIGNOR TO UNITED STATES FASTENER COMPANY, OF BOSTON, MASSACHUSETTS, A CORPORATION OF MAINE.

SNAP-FASTENER.

No. 894,270.        Specification of Letters Patent.        Patented July 28, 1908.

Application filed February 11, 1908. Serial No. 415,322.

*To all whom it may concern:*

Be it known that I, GEORGE A. HOLMES, a citizen of the United States, and resident of Newton, in the county of Middlesex and State of Massachusetts, have invented new and useful Improvements in Snap-Fasteners, of which the following is a specification.

My invention relates to snap fasteners and more particularly to that class of snap fasteners in which the stud member, or socket member, or both, comprises two parts disposed on opposite sides of the material.

As is well known, it is usual to place ornamentation of different sorts upon snap fasteners. This ornamentation may consist for example of the name or trade mark of a manufacturer, or some device such as the seal or coat of arms of a city or state for use upon uniforms. Sometimes the ornamentation is placed upon the cap of the socket member and at other times upon the flange of the stud member.

Obviously, it is often of the utmost importance, in order that the ornamentation may be displayed to the best advantage, that the design upon the fastener shall remain in a fixed and predetermined position after it has been attached to the material. This is particularly true when a design is placed upon a fastener for use upon uniforms. Many attempts have been made to accomplish this result but they have been unsuccessful; for in some fasteners the parts turn relatively to each other, thus permitting the design to slip from the position in which it was originally placed, while in others the same objectionable result is present because of the turning of the fastener upon the material.

The object of this invention is to provide a member for a snap fastener of the class described, the parts of which cannot turn relatively to each other nor twist upon the material to which they are attached.

Referring to the drawings,—Figure 1 is a sectional view of the upper portion of a socket member; Fig. 2 is a plan view of the parts shown in Fig. 1; Fig. 3 is a sectional view of the lower portion of a socket member; Figs. 4 and 5 are respectively plan views of a dome and stud retaining device shown in Fig. 3; Fig. 6 is the upper portion of a stud member; Figs. 7 and 8 are respectively an elevation and plan view of the lower portion of a stud member; Fig. 9 shows in section a stud member attached to material; and Fig. 10 shows, partly in section and partly in elevation, a snap fastener attached to material.

A is the upper section of a socket member and comprises a cap $a'$ clenched over a disk $a^2$. As shown in Fig. 2, the disk $a^2$ is provided with radial ribs which prevent the cap $a'$ and the disk $a^2$ from turning relatively to each other and also prevent the upper section of the socket member from turning upon the material. The disk $a^2$ is further provided with an eyelet or male member $a^3$ adapted to pass through the material.

The lower section of the socket member, which is adapted to be seated on the opposite side of the material, comprises a dome $b'$ having a non-circular opening adapted to receive the eyelet $a^3$. This opening, the function of which will be hereinafter more particularly described, is shown in Fig. 4 as hexagonal in form; it may be made in other forms witout departing from my invention, the essential thing being that it is non-circular. Within the dome $b'$ is a stud retaining device consisting of a spring $b^2$ made of a single piece of wire or other suitable material so bent as to form substantially two circles one within the other. This spring is held within the dome $b'$ by a collet $b^3$ having a central stud receiving opening and provided with a boss $b^4$ which prevents the spring $b^2$ from rotating within the dome. The outer circle of the spring $b^2$ presses against the wall of the dome $b'$ and the inner circle projects over the stud receiving opening in the collet $b^3$.

When the eyelet $a^3$ is inserted into the opening in the dome $b'$ and pressure is applied by suitable instruments, the parts will assume the position shown in Fig. 10, the expanding eyelet filling out the opening and practically taking its shape. By reason of the non-circular form of the opening into which the eyelet is inserted, the margin of the opening has one or more points reëntrant in relation to the contour of the eyelet barrel and the eyelet barrel and the margin of the opening have therefore a point or points of relatively emphatic mutual engagement. As a result of this construction, the eyelet is locked in position and is prevented from turning in the opening.

Although in Figs. 1 and 3 I have shown the male member circular and the opening which receives and engages said male member non-circular, I do not desire to limit myself to this construction for, as shown in Figs. 6 to 9, the male member may be made non-circular and the opening circular without departing from my invention.

Referring to Figs. 6 and 7, C is the upper section of a stud member comprising a head $c'$ and an eyelet or female member $c^2$. D is the male member adapted to be seated on the opposite side of the material and comprising a base $d'$ and a post $d^2$. The base $d'$ is provided with radial ribs (Fig. 8) which grip the material and prevent the part D from turning thereon. The upper portion of the post $d^2$ is rounded and its lower portion is non-circular. When the post $d^2$ of the male member D is inserted in the eyelet $c^2$ and pressure is applied by suitable instruments, the parts will assume the position shown in Fig. 9. The eyelet $c^2$ contracts and takes practically the non-circular form of that portion of the male member which it engages. There is therefore, as in the socket member already described, one or more points of relatively emphatic mutual engagement between the male member and the margin of the opening into which it is inserted and the eyelet is prevented from turning relatively to the post.

By this construction I provide a snap fastener member, the parts of which cannot turn upon the material to which they are attached, nor can any part turn relatively to any other part.

I claim:

1. In a snap fastener, a member comprising two parts, one part provided with an open end tubular eyelet and the other part disposed on the opposite side of the material and provided with a non-circular opening adapted to receive said eyelet, and said eyelet adapted to take substantially the shape of said opening when the parts are assembled, whereby said eyelet is prevented from turning in said opening.

2. In a snap fastener, a member comprising two parts, one part provided with an open end tubular eyelet and the other part disposed on the opposite side of the material and provided with a polygonal opening adapted to receive said eyelet, and said eyelet adapted to take substantially the shape of said opening when the parts are assembled, whereby said eyelet is prevented from turning in said opening.

3. In a snap fastener, a member comprising a cap, a disk within said cap provided with radial ribs, an eyelet integral with said disk, a dome seated on the opposite side of the material and having a non-circular opening adapted to receive said eyelet and prevent the same from turning in said opening, a stud retaining device within said dome consisting of a spring bent to form substantially two circles one within the other, a collet having a central stud receiving opening and a boss adapted to prevent said spring from rotating, the inner circle of said spring projecting over said stud receiving opening.

4. In a snap fastener, a member comprising a cap, a disk within said cap provided with radial ribs, an eyelet integral with said disk, a dome seated on the opposite side of the material and having a polygonal opening adapted to receive said eyelet and prevent the same from turning in said opening, a stud retaining device within said dome consisting of a spring bent to form substantially two circles one within the other, a collet having a central stud receiving opening and a boss adapted to prevent said spring from rotating, the inner circles of said spring projecting over said stud receiving opening.

Signed by me at Boston, Massachusetts this fourth day of February, 1908.

GEORGE A. HOLMES.

Witnesses:
CHARLES D. WOODBERRY,
JOSEPHINE H. RYAN.